US005778953A

United States Patent [19]

Braddock

[11] Patent Number: 5,778,953
[45] Date of Patent: Jul. 14, 1998

[54] METHOD AND APPARATUS FOR CARRYING AND SUPPORTING A PORTABLE BENCH TOP SAW

[75] Inventor: Lawrence D. Braddock, Portland, Oreg.

[73] Assignee: Trojan Manufacturing, Inc., Portland, Oreg.

[21] Appl. No.: 687,106

[22] Filed: Jul. 22, 1996

[51] Int. Cl.[6] .................................................. B25H 1/00
[52] U.S. Cl. ...................... 144/286.1; 451/361; 83/477.2; 83/859; 269/289 R; 269/17; 248/129
[58] Field of Search ...................... 83/473, 477.2, 83/859, 699.51, 699.61, 698.41; 280/30, 47.18, 47.33; 248/129, 291.1; 403/230, 256, 362; 108/18, 50, 159; 269/17, 296, 297, 289 R, 299; 241/286, 287; 451/361, 340; 144/286.1, 1.1, 286.5

[56] References Cited

U.S. PATENT DOCUMENTS

| 724,991 | 4/1903 | Caton | 280/47.33 |
|---|---|---|---|
| 3,465,797 | 9/1969 | Kimber | 83/473 |
| 4,269,096 | 5/1981 | Boone | 108/18 |
| 4,640,326 | 2/1987 | Hewitt | 269/289 |
| 5,259,602 | 11/1993 | Rogos | 269/17 |
| 5,452,908 | 9/1995 | Bencic | 280/47.18 |
| 5,564,720 | 10/1996 | Stringer | 280/30 |
| 5,603,491 | 2/1997 | Murrell | 269/17 |

OTHER PUBLICATIONS

Trojan Manufacturing, Inc. MS–2000 Portable Miter Saw Stand.
Trojan Manufacturing, Inc. Rip Master.
Rousseau Co. MiniSaw PortaMax–P.M. 2700.
RMC Mfg. Co. Zip Rip Portable Fence Systems.
Trend–Lines Delta 10" Contractor's Saw with Unifence.
Trend–Lines Special Edition Unisaws.

*Primary Examiner*—Joseph M. Gorski
*Assistant Examiner*—Katrina Davis
*Attorney, Agent, or Firm*—William A. Birdwell & Associates

[57] ABSTRACT

A method and apparatus for carrying and supporting a portable bench top saw wherein the saw has a body housing a saw blade, the body being generally adapted for four-corner screw attachment downwardly into a table, the apparatus comprising a carrying frame having a transversely adjustable member for receiving a screw for attachment to the saw body in a multitude of transverse locations required thereby. Preferably, the saw also includes an attachable table assembly supported with a downwardly projecting table leg and, preferably, the carrying frame includes a transversely positionable leg receiving member, for receiving the table leg at any of a multitude of transverse locations required thereby.

10 Claims, 1 Drawing Sheet

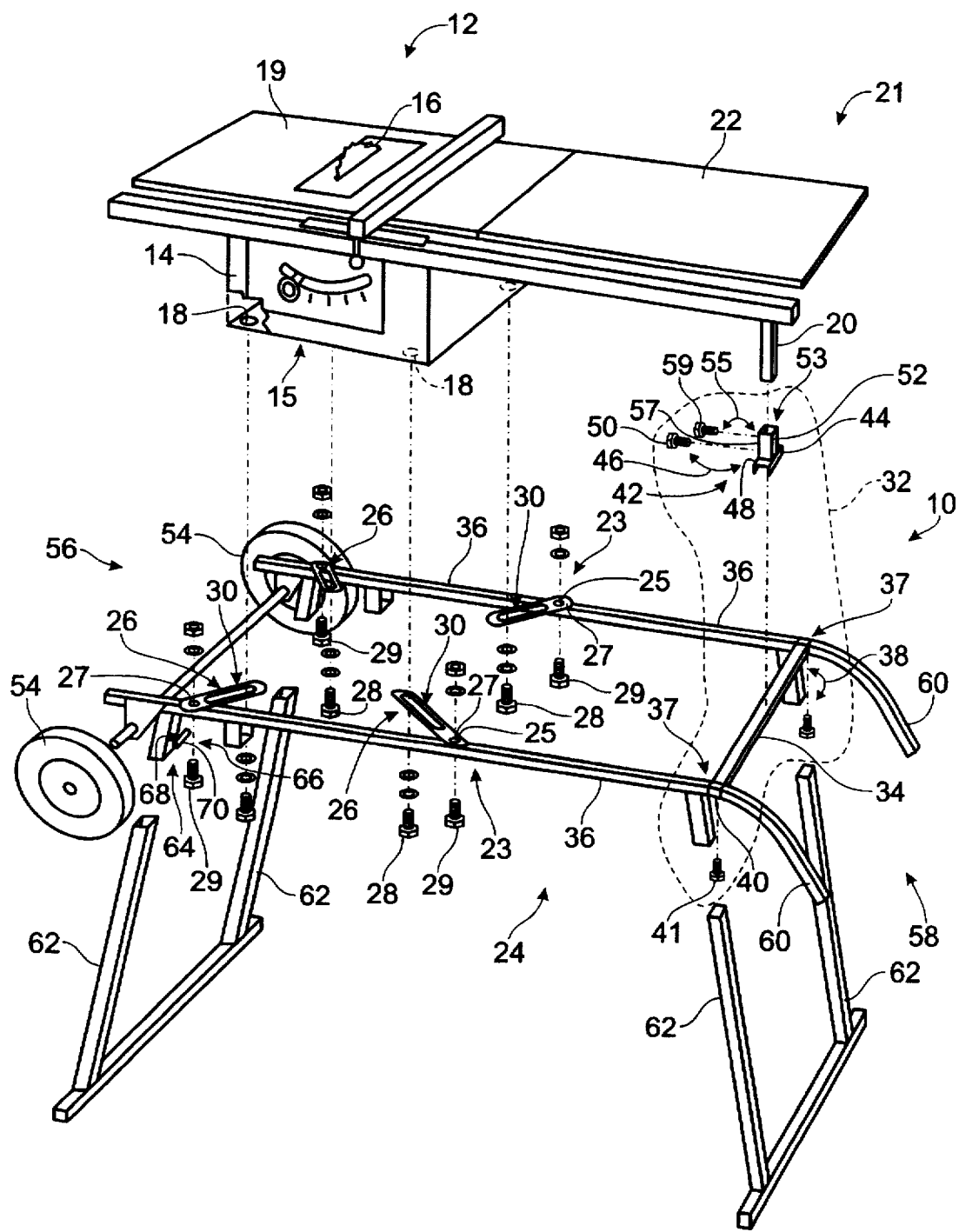

METHOD AND APPARATUS FOR CARRYING AND SUPPORTING A PORTABLE BENCH TOP SAW

BACKGROUND OF THE INVENTION

This invention relates to methods and apparatus for carrying and supporting a bench top saw, particularly such methods and apparatus adapted for carrying, supporting and stowing a portable bench top saw without modification thereof.

It is desirable to provide a portable bench top saw (hereinafter, "table saw") with the positional stability and, therefore, accuracy of a permanently mounted saw, such as employed in a cabinet shop. It is also desirable, however, to retain the portability of the portable table saw, and it is further desirable, especially in a small shop such as found at home, to have the capability of moving the saw into and out of a position of stowage. Such an apparatus has been provided by Trojan Manufacturing Inc., of Portland, Ore., and marketed successfully under the trademark RIP MASTER ("the Trojan device").

Typically, apparatus for carrying and supporting a table saw, such as the Trojan device, have comprised carrying frames and may, like the Trojan device, include wheels for portability. Moreover, the Trojan device is known to provide for upright, space-efficient stowage when the table saw is not in use.

To provide for the desired positional stability and accuracy in supporting the table saw, such prior art apparatus have employed rigid carrying frames providing for rigid attachments to the table saw. To provide this advantage, prior art carrying frames have been sized during manufacture to fit a particular make and model of table saw. This has allowed generally stiffer joints in the carrying frame, increasing its rigidity.

However, manufacturing different sized carrying frames for different makes and models of table saws has disadvantages. These include a lesser capacity for mass production and, therefore, economy of scale owing primarily to increased tooling and set-up requirements; increased stocking and floor space requirements at the point of sale; and increased cost as a result of the foregoing. Moreover, a particularly adapted carrying frame is disadvantageous to any customer who would like to change make or model of table saw without incurring the additional cost of another carrying frame.

Accordingly, there is a need for a novel method and apparatus for carrying and supporting a table saw which overcomes the aforementioned disadvantages by retaining the mounting rigidity of prior art carrying frames while increasing flexibility in manufacturing, sale and use, and decreasing cost.

SUMMARY OF THE INVENTION

The method and apparatus for carrying a portable table saw of the present invention solves the aforementioned problems and meets the aforementioned needs for use with an existing table saw having a body housing a saw blade, the body being generally adapted for four-corner screw attachment downwardly into a table, a carrying frame having a transversely adjustable member for receiving a screw for attachment to the body in a multitude of transverse locations required thereby. Preferably, the transversely adjustable member is pivotally attached to the carrying frame and includes an elongate aperture extending therealong, for receiving the screw therein.

Preferably, the saw is fitted with an attachable table assembly supported with a downwardly projecting table leg and, preferably, the carrying frame accommodates the same by including a transversely positionable leg receiving member, for receiving the table leg at any of a multitude of transverse locations required thereby. Preferably, the leg receiving member includes a frame-rail spreader bar slidably attached and substantially orthogonal to frame-rails of the frame member, for longitudinal positioning thereof, the frame-rail spreader bar including a leg yoke member slidably attached thereto, for lateral positioning of the leg yoke member, the leg yoke member including an elongate receiving portion adapted to receive table legs of varying sizes.

Preferably, the carrying frame is adapted for transport and stowage of the table saw, by providing wheels disposed proximate the table saw, and legs that are removable from the carrying frame.

Therefore, it is a principal object of the present invention to provide a novel method and apparatus for carrying and supporting a portable table saw.

It is another object of the present invention to provide such a method and apparatus that is adaptable to a number of different makes and models of table saws.

It is still another object of the present invention to provide such a method and apparatus providing for transport and stowage of the table saw.

It is a further object of the present invention to provide such a method and apparatus that decreases the cost associated with manufacture, sale and use of the apparatus of the invention.

It is still a further object of the present invention to provide such a method and apparatus having the aforementioned advantages while retaining stability and, therefore, accuracy.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 1 is a pictorial view of an apparatus for carrying and supporting a portable table saw according to the present invention.

DETAILED DESCRIPTION OF A PREFERRED EMBODIMENT

Referring to FIG. 1, an apparatus 10 is employed for carrying and supporting a portable table saw 12. The saw 12 can be one of a number of commercially available makes and models of portable table saws, such as those manufactured by the companies known as Skil, Delta, Craftsman, Protech, Black & Decker, Clarke and Tradesman. The saw 12 generally has a body 14 housing a saw blade 16 and drive motor (not shown), the body 14 including provision for attachment to a bench, table or frame at a base 15 thereof. Preferably, the body 14 includes one or more apertures 18 for screw-attachment to the bench, table or frame. More specifically, it is preferable that the body 14 includes four apertures 18 at four respective corners thereof The apparatus 10 includes a carrying frame 24 for carrying, supporting and stowing the saw 12 as will be described below in OPERATION. The carrying frame includes one or more transversely adjustable members 26, for receiving a screw 28 for attachment to the body 14 through one of the apertures 18. Herein, "transverse" refers to both longitudinal and lateral directions, i.e., to the plane in which these directions lie. Preferably, the carrying frame includes four of the adjustable members 26, corresponding to four apertures 18 in the saw 12.

In a preferred embodiment of the invention for use with a saw 12 having four apertures 18 positioned at respective corners thereof, the transversely adjustable members 26 are pivotally attached to the carrying frame 24 at locations 23 thereon, proximate to and corresponding with the locations of the apertures 18 of the saw 12 when the saw is placed thereon for attachment. The adjustable members are, thereby, permitted positioning by altering the angular orientation thereof.

The adjustable members are connected to the carrying frame via, preferably, corresponding apertures 25 in an end 27 of the adjustable member and in the carrying frame through which are passed fasteners 29, preferably by threaded fasteners such as machine screws and nuts. However, other methods, as known in the art, of fastening may be employed for adjustably fastening, gripping, clamping or otherwise securing one element of the invention to another without departing from the principles of the invention.

The adjustable members further include an elongate aperture 30, such as a slot, extending away from the end 27, so that a portion of the aperture 30 may be adjusted by angular positioning of the adjustable member 26 to align precisely with the corresponding aperture 18.

While four adjustable members 26 have been described as preferred, more or fewer adjustable members may be employed, depending on the particular saw 12 being attached and the preference of the user. Four of the aforedescribed adjustable members 26 disposed at respective corners of the saw 12 have been found to provide, in an otherwise relatively rigid carrying frame 24, a satisfactory degree of positional stability to the saw when mounted thereon.

If the adjustable members 26 are configured to extend a greater distance from the carrying frame, such as by being more elongate, a greater degree of adjustment to fit the saw 12 is permitted. At the same time, a somewhat lesser rigidity is obtained, as an increased torque is available to twist the adjustable members 26 at their pivotal connections. To offset this, it is preferable that lines connecting the apertures 18 of the saw 12 and the locations 25 of the corresponding pivotal connections are directed, to the extent possible, toward the center of the base 15 so that, for any direction of force applied to the saw 12, at least one of the adjustable members 26 may be in an orientation which is advantageous for offering resistance.

Preferably, the saw 12 is provided with a table and leg assembly 21 having a laterally disposed table 22 for assisting the feeding of an object to be sawed to the saw blade for sawing. The table 22 has a downwardly projecting table leg 20, the leg being positioned to support the table. The leg 20 is adapted to extend downwardly an adjustable distance so that the leg will position the table 22 to be both flush with and parallel to a top portion 19 of the saw 12. Such a table and leg assembly 21 for a portable bench top saw is manufactured by Trojan Manufacturing Inc., of Portland, Ore., and marketed under the trademark RIP RITE ASSEMBLY.

For receiving the table leg 20, the carrying frame 24 preferably includes a transversely positionable leg receiving assembly 32. The leg receiving member is preferably positionable to receive the table leg in any of a multitude of transverse locations required by the leg 20 as a result of the size of the saw 12.

For longitudinal positioning, the leg receiving assembly 32 preferably includes an elongate frame-rail bridge 34 slidably attached and extending substantially orthogonal to spaced-apart elongate frame-rails 36 of the carrying frame 24. The bridge 34 includes, preferably at both ends thereof, gripping means 37 for slidably gripping the frame-rails 36, and locking means 38 for locking the gripping means, to permit locking the bridge in place. Preferably, the gripping means 37 is adapted to conform in cross-sectional shape and size to the frame-rails 36 to permit the frame-rails to slidably fit therein. Preferably, the locking means 38 includes a threaded aperture 40 to receive a locking screw 41 which may be tightened against the corresponding frame-rail 36 at a longitudinal position of the bridge 34 which is appropriate for receiving the table leg 20.

For lateral positioning to receive the table leg 20, the leg receiving assembly 32 includes a leg yoke member 42. The leg yoke member is slidably attached to the bridge 34, to permit travel therealong and, therefore, lateral positioning of the leg yoke at any of a number of positions between the frame-rails 36.

The leg yoke member 42 includes gripping means 44 for slidably gripping the bridge 34 and locking means 46 for locking the gripping means, to permit locking of the slidable attachment to the bridge 34. Preferably, the gripping means 44 is adapted to conform in cross-sectional shape and size to the bridge to permit the bridge to slidably fit thereinside. Preferably, the locking means 46 includes a threaded aperture 48 to receive a locking screw 50 which may be tightened against the bridge at a lateral position of the leg yoke member 42 which is appropriate for receiving the table leg 20.

The aforedescribed frame-rails 36 and bridge 34 are preferably formed of square tubing. Thence, the associated gripping means 37 and 44 preferably employ a square cross-section.

The yoke member includes a receiving portion 52 including means 53 for receiving the table leg 20. The receiving means 53 is preferably formed of a tube which conforms in cross-sectional shape to the table leg 20, which is typically square, and is sized to receive the leg, preferably, inside thereof. Accordingly, a locking assembly 55 is employed in the receiving means 53, the locking means including a threaded aperture 57 to receive a locking screw 59 which may be tightened against the corresponding leg 20.

Preferably, the table leg 20 of the table and leg assembly 21 is of a standardized cross-sectional shape and size. However, to accommodate different cross-sectional sizes of table legs 20, the receiving means 53 may be sized in cross-section to fit either the largest table leg anticipated, where the receiving means 53 is adapted to receive the leg therein, or the smallest, where the receiving means 53 is adapted to receive the leg thereover. Moreover, as will be apparent to those of ordinary mechanical skill, the table leg 20 may have a different cross-sectional shape than does the receiving portion 52 and still be received thereby.

Preferably, the carrying frame 24, the bridge 34 and the yoke receiving member 42 are formed of metal. However, other materials, such as plastic, and other cross-sectional configurations, such as circular, may be employed, without departing from the principles of the present invention.

The carrying frame 24 preferably includes wheels 54 disposed at an end 56 thereof which functions as a bottom end when the carrying frame is being employed for transporting and stowing the saw 12 in an upright carrying position. An opposite end 58 of the carrying frame preferably includes handles 60 to assist the user in transporting the saw 12.

The carrying frame also includes, preferably, four frame legs 62, each of the frame legs being adapted to be received by an associated one of two of the frame-rails 36. For this purpose, the carrying frame 24 includes a frame leg receiving means 64 for slidably receiving an associated frame leg 62, and locking means 66 for locking the receiving means 64. Preferably, the receiving means is adapted to conform in cross-sectional shape to the frame leg 62, and in size to permit the frame leg to slidably fit thereinside. Preferably, the locking means 66 includes a threaded aperture 68 to receive a locking screw 70, preferably having a "T" handle, which may be tightened against the frame leg. The frame legs 62 support the frame 24 so that the table saw 12 is oriented for use.

OPERATION

The carrying frame 24 is adjusted to accommodate a particular make and model of the aforedescribed saw 12. Generally, the table leg 20 will be disposed so that the bridge 34 and the leg yoke member 42 need to be adjusted for insertion of the leg into the receiving portion 52 of the yoke member. It is generally preferable that the leg receiving member 32 be adjusted first, so that the saw 12 may be brought down to meet the carrying frame at the same time the leg is being received by the receiving portion.

To adjust the leg receiving member 32, either or both longitudinal and lateral positioning may be employed as needed. For longitudinal positioning, the bridge 34 is slid with respect to the frame-rails 36 while the locking means 38 is loose, the locking means being tightened at one or both gripping means 37 at a longitudinal position along the frame-rails which provides that the receiving portion 52 of the leg yoke member 42 attached to the bridge is positioned longitudinally to receive the leg 20.

For lateral positioning, the leg yoke member 42 is slid with respect to the bridge 34 while the locking means 46 is loose, the locking means being tightened at the gripping means 44 at a lateral position on the bridge which provides that the receiving portion 52 of the leg yoke member 42 attached thereto is positioned laterally to receive the leg 20.

To ready the saw 12 for downward positioning onto the carrying frame, screws of the threaded fastener 29 are passed through the apertures 25 in the carrying frame and in the corresponding adjustable members 26. The adjustable members 26 are pivoted to align their elongate apertures 28 with the corresponding apertures 18 in the body 14 of the saw 12. Nuts of the threaded fasteners 29 permit the screws to be tightened to secure the adjustable members in the selected angular orientation.

As the saw 12 is brought downwardly onto the carrying frame 24, the leg 20 is received by the elongate receiving portion 52 of the leg yoke member 42. The locking screw 58 is thence permitted to contact the leg 20 and be tightened thereagainst. In position, the saw base 15 rests on the adjustable members 26; however, it may rest as well on the carrying frame 24, depending on the relative sizes of the saw 12 and frame 24.

The carrying frame 24 is adapted for transportation and stowage by removing the frame legs 62 at the frame leg gripping means 64 and tipping the carrying frame onto the wheels 54, preferably by grasping the handles 60. The carrying frame may be conveniently stowed in a substantially upright position with the wheels 60 and the saw 12 forming a tripod. The frame legs 62 are removed by loosening the locking means 66 and pulling the frame legs outwardly from the gripping means 64.

It is to be recognized that, while a specific method and apparatus for carrying and supporting a portable bench top saw has been shown as preferred, other configurations could be utilized, in addition to configurations already mentioned, without departing from the principles of the invention. For example, gripping and locking means may be employed throughout that are once-adjustable rather than repetitively adjustable, mating elements, such as gripping and locking means, may be reversed, and sliding fits may be obtained by numerous other means known in the art to those of ordinary skill.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. An apparatus for carrying and supporting a portable bench top machining tool, the bench top machining tool having a pre-positioned plurality of first means for receiving respective fasteners at a base portion thereof, the apparatus comprising:

a relatively rigid carrying frame for supporting a bench top machining tool, said carrying frame including two substantially parallel rails;

at least one wheel connected to a first end of said carrying frame for transporting the apparatus in a substantially up-right carrying position; and a plurality of adjustable connection members disposed on each of said rails; each connection member being pivotally connected to its respective rail and including second means for receiving the fasteners, said connection members being adapted to receive the base portion of the bench top machining tool and said second means of said connection members being separately positionally adjustable both longitudinally and laterally with respect to one another by pivoting said connection members to permit said second means to align with the respective pre-positioned first means so as to accommodate the non-uniform shapes of different models of the bench top machining tool and thereby adjust the balance of the bench top maching tool with respect to said wheel so that the weight of the bench top maching tool is substantially evenly distributed over said wheel for ease of use.

2. The apparatus of claim 1, wherein the machining tool includes four of the pre-positioned first means for receiving a fastener at respective corners of the base portion, the apparatus comprising four of said connection members corresponding to the four of the pre-positioned first means.

3. The apparatus of claim 1, wherein the first means for receiving a fastener includes an aperture through the base portion and said second means for receiving the fastener comprises an elongate aperture in a corresponding connection member.

4. The apparatus of claim 1, wherein the first means for receiving a fastener includes an aperture through the base and said second means for receiving the fastener comprises an elongate aperture in said connection member.

5. The apparatus of claim 1, further comprising:

a table assembly associated with said base portion and having a table leg extending toward said carrying frame, said carrying frame having a transversely adjustable leg receiving member positionally adjustable both longitudinally and laterally to receive said table leg.

6. The apparatus of claim 5, wherein said leg receiving member includes a bridge having a first gripping means for slidably gripping said frame rails, and a first locking means for releasably locking said gripping means at a selected longitudinal position of said bridge with respect to said frame rails.

7. The apparatus of claim 6, wherein said leg receiving member includes a yoke member having a second gripping means for slidably gripping said bridge, and a second locking means for releasably locking said second gripping means at a selected lateral position along said bridge.

8. The apparatus of claim 7, wherein said yoke member includes a receiving portion for receiving the table leg, the receiving portion including a third gripping means for slidably gripping the table leg and a third locking means for releasably locking said third gripping means.

9. The apparatus of claim 1, wherein said carrying frame includes a handle at a second end opposite said first end, said handle being adapted to assist a user to grasp the apparatus for transporting the apparatus in said substantially up-right carrying position.

10. The apparatus of claim 1, wherein said carrying frame includes at least three removable frame legs adapted to support the apparatus so that the bench top machining tool is oriented for use.

* * * * *